(12) United States Patent
Albisu et al.

(10) Patent No.: US 8,117,438 B1
(45) Date of Patent: Feb. 14, 2012

(54) METHOD AND APPARATUS FOR PROVIDING SECURE MESSAGING SERVICE CERTIFICATE REGISTRATION

(75) Inventors: Luis F. Albisu, Fairfax Station, VA (US); Fikru Kumbi, Reston, VA (US); Walter Pidkameny, Westfield, NJ (US); Michael W. Sterner, Stafford, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1340 days.

(21) Appl. No.: 11/319,968

(22) Filed: Dec. 28, 2005

(51) Int. Cl.
- H04L 29/06 (2006.01)
- G06F 7/04 (2006.01)
- G06F 9/00 (2006.01)
- H04N 7/167 (2011.01)

(52) U.S. Cl. .......... 713/156; 713/157; 713/160; 726/10; 726/13; 380/229; 380/232

(58) Field of Classification Search .................. 713/152, 713/156, 157, 160; 726/10, 13; 380/229, 380/232
See application file for complete search history.

(56) References Cited

U.S. PATENT DOCUMENTS

| | | | |
|---|---|---|---|
| 6,904,150 B1* | 6/2005 | Dent | 380/28 |
| 6,986,049 B2* | 1/2006 | Delany | 713/176 |
| 6,990,578 B1* | 1/2006 | O'Brien et al. | 713/156 |
| 7,263,619 B1* | 8/2007 | Kim | 713/194 |
| 2002/0032861 A1* | 3/2002 | Azuma | 713/170 |
| 2003/0115448 A1* | 6/2003 | Bouchard | 713/153 |
| 2004/0019780 A1* | 1/2004 | Waugh et al. | 713/152 |
| 2005/0102499 A1* | 5/2005 | Kosuga et al. | 713/152 |
| 2005/0114652 A1* | 5/2005 | Swedor et al. | 713/156 |
| 2005/0268327 A1* | 12/2005 | Starikov | 726/1 |
| 2006/0123476 A1* | 6/2006 | Yaghmour | 726/22 |
| 2007/0028097 A1* | 2/2007 | Masui et al. | 713/156 |
| 2007/0083749 A1* | 4/2007 | Fang | 713/152 |
| 2008/0046745 A1* | 2/2008 | Buch et al. | 713/176 |

* cited by examiner

Primary Examiner — Mohammad Reza (57) ABSTRACT

A method and apparatus for providing an automated SMS registration mechanism to support authentication, authorization, creation and maintenance of PKI related tasks using web authentication that is keyed by corporate Lightweight Directory Access Protocol (LDAP) are disclosed. In one embodiment, a LDAP is protocol that organizes directory hierarchies and interfaces to directory servers that can be used by an end user to access directory listing to locate people, addresses, phone numbers, and other resources in a public Internet or a corporate intranet.

14 Claims, 6 Drawing Sheets

METHOD AND APPARATUS FOR PROVIDING SECURE MESSAGING SERVICE CERTIFICATE REGISTRATION

The present invention relates generally to communication networks and, more particularly, to a method and apparatus for providing a Secure Messaging Service (SMS) certificate registration process in communication networks, e.g., packet networks such as Internet Protocol (IP) networks.

BACKGROUND OF THE INVENTION

In order to provide secure messaging services (SMS) over the Internet between a sender and a receiver, public key encryption is commonly used to achieve the required security to exchange private and sensitive data. The secure communications provided by public key encryption can be applied to a variety of electronic transactions including, but not limited to, email, electronic commerce, and electronic funds transfers. A public key infrastructure (PKI) is required to facilitate public key encryption based communications to support verification and authentication of the validity of each party involved in a public key encryption based transaction. Traditionally, a PKI is not linked in an automated manner to systems and applications, such as corporate email systems and email address list directory, which support email communications between a sender and a receiver.

Therefore, a need exists for a method and apparatus for providing a Secure Messaging Service (SMS) certificate registration process in a packet network, e.g., an IP network.

SUMMARY OF THE INVENTION

In one embodiment, the present invention provides an automated SMS registration mechanism to support authentication, authorization, creation and maintenance of PKI related tasks, e.g., using web authentication that is keyed by corporate Lightweight Directory Access Protocol (LDAP). In one embodiment, a LDAP is a protocol that organizes directory hierarchies and interfaces to directory servers that can be used by an end user to access directory listing to locate people, addresses, phone numbers, and other resources in a public Internet or a corporate intranet. In one embodiment, the present invention provides a simplified and automated method to issue, distribute and manage user digital certificates and eliminates the need for the user to publish the issued digital certificate to the public.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In order to provide secure messaging services (SMS) over the Internet between a sender and a receiver, public key encryption is commonly used to achieve the required security to exchange private and sensitive data. The secure communications provided by public key encryption can be applied to a variety of electronic transactions including, but not limited to, email, electronic commerce, and electronic funds transfers. A public key infrastructure (PKI) is required to facilitate public key encryption based communications to support verification and authentication of the validity of each party involved in a public key encryption based transaction. Traditionally, a PKI is not linked in an automated manner to systems and applications, such as corporate email systems and email address list directory, which support email communications between a sender and a receiver.

To address this need, the present invention provides an automated SMS registration mechanism to support authentication, authorization, creation and maintenance of PKI related tasks using web authentication that is keyed by corporate Lightweight Directory Access Protocol (LDAP). In one embodiment, a LDAP is protocol that organizes directory hierarchies and interfaces to directory servers that can be used by an end user to access directory listing to locate people, addresses, phone numbers, and other resources in a public Internet or a corporate intranet. In one embodiment, the present invention provides a simplified and automated method to issue, distribute and manage user digital certificates and eliminates the need for the user to publish the issued digital certificate to the public. In addition, the user does not need to manually enter any information during the registration process. The present invention supports the following PKI related tasks to facilitate public key encryption based communications in an automated and seamless manner. The PKI tasks that are automated may include:

- processing user's requests of digital certificates;
- authenticating user through corporate network security platform;
- issuing and installing digital certificates in user's computer;
- using meta-directory process to forward the issued digital certificate to the corporate email directory to be published; and
- allowing the user to send encrypted email to another user with the recipient's digital certificate automatically retrieved from the corporate email address list directory to encrypt the message.

A digital certificate is an electronic document that proves the identity of an end user, such as the sender of an encrypted email.

Public key encryption is a cryptographic method that uses a matched pair of encryption keys, a private key and a public key, which are mathematically linked. Each key performs a one-way transformation on the data to be encrypted. Each key is the inverse function of the other; what one does, only the other can undo. The public key is made publicly available while the private key is kept secret by its owner. To send a secure message, a sender, or an owner, encrypts the message with the intended recipient's public key. Once so encrypted, the message can only be decrypted with the recipient's private key.

Figure 1:
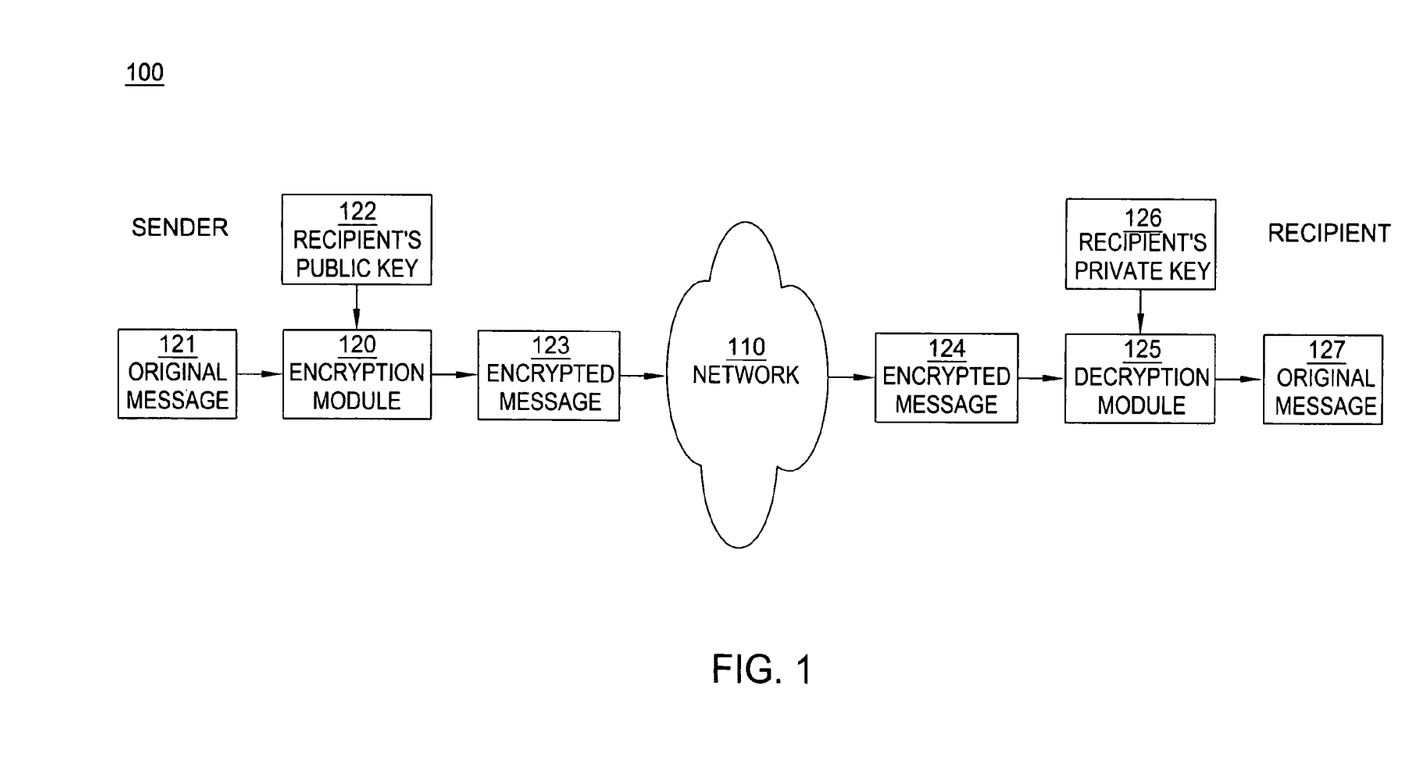
FIG. 1 illustrates an example of sending a secure private message using public key encryption related to the present invention.

FIG. 1 illustrates an example 100 of sending a secure private message using public key encryption related to the present invention. In FIG. 1, a sender wants to securely send a message, e.g., original message 121, to an intended recipient. The sender uses the recipient's public key 122 to encrypt the original message 121 using encryption module 120 to create an encrypted message 123. The sender sends the encrypted message 123 via network 110 to the intended recipient. The intended recipient receives the transmitted encrypted message 124 and decrypts it with the recipient's private key 126 using decryption module 125 to produce the original message 127 that exactly matches the original message 121 sent by the sender. The encrypted message can only be decrypted using the recipient's private key. Without the recipient's private key, the encrypted message cannot be decrypted.

On the other hand, a sender can also encrypt a message using the sender's private key to an intended recipient. Upon receiving the encrypted message, the recipient uses the sender's public key to decrypt the message in order to uniquely identify the sender's identity and authenticity. This provides the basis for digital signature. Since only the sender knows the sender's own private key, the encrypted message becomes an electronically, or digitally, signed document that nobody else can produce.

Figure 2:
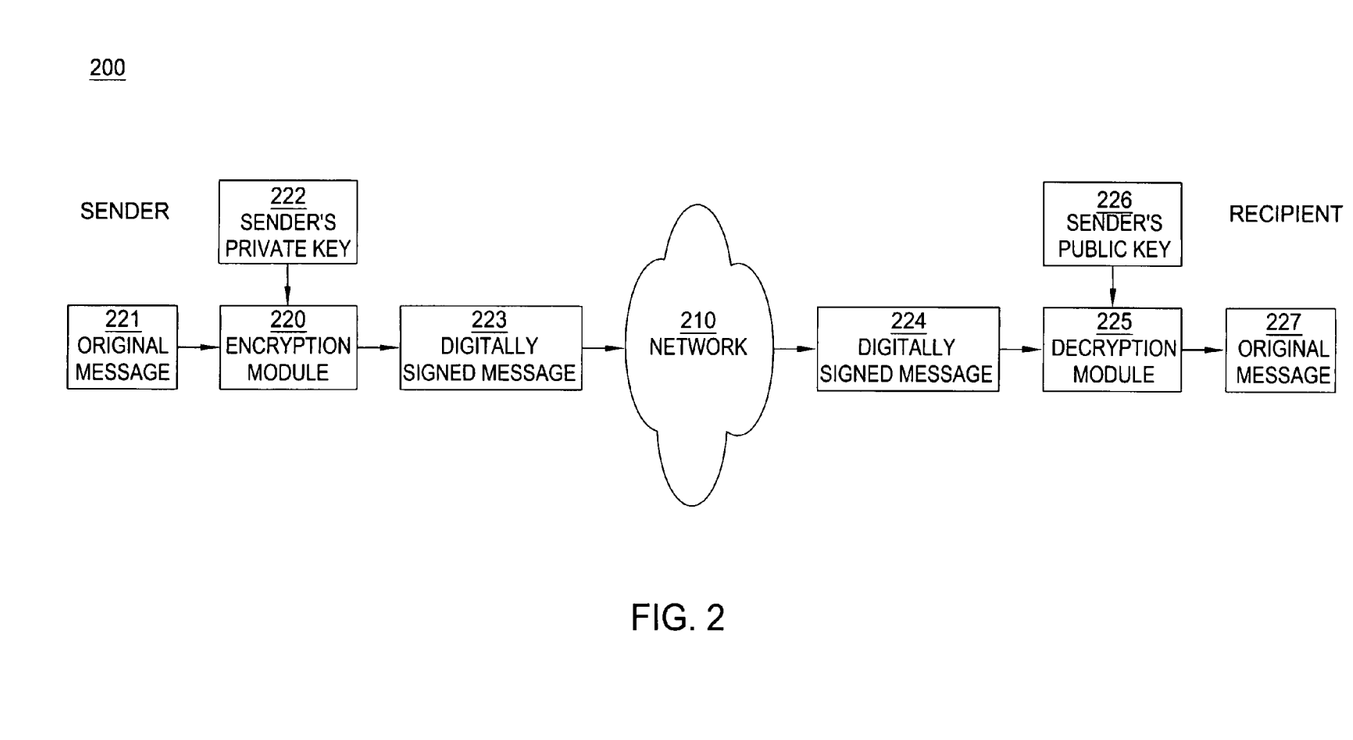
FIG. 2 illustrates an example of sending a digitally signed message using public key encryption related to the present invention.

FIG. 2 illustrates an example 200 of sending a digitally signed message using public key encryption related to the present invention. In FIG. 2, a sender wants to send a signed message, e.g., original message 221, digitally to an intended recipient. The sender uses the sender's private key 222 to encrypt original message 221 using encryption module 220 to create a digitally signed message 223. The sender sends the digitally signed message 223 via network 210 to the intended recipient. The intended recipient receives the transmitted digitally signed message 224 and decrypts it with the sender's public key 226 using decryption module 225 to produce the original message 227 that exactly matches the original message 221 sent by the sender. If a digitally signed message can be decrypted using a sender's public key, then the message must have been originated by the sender because the sender must use the sender's private key to create the encrypted and digitally signed message.

One aspect of public key encryption is the distribution of public keys and a PKI provides a method to support public key distribution. A PKI is a system of digital certificates and certificate authorities (CA) that verify and authenticate the validity of each party involved in a communication or a transaction that uses public key encryption for security purposes. A digital certificate is an electronic document that proves the identity of an end user, such as the sender of an encrypted email. A digital certificate may contain the following:

owner's public key
owner's name
expiration date of the public key
name of the issuer such as the CA that issued the digital certificate
serial number of the digital certificate
digital signature of the issuer A CA is a trusted organization or company that issues digital certificates used to create public-private key pairs. The role of the CA is to guarantee that the individual granted the unique certificate is, in fact, who he or she claims to be. More importantly, in order to create an effective and efficient PKI that supports public key cryptography, the PKI and the systems responsible for sending secure messages must be linked together in an automated manner.

Figure 3:
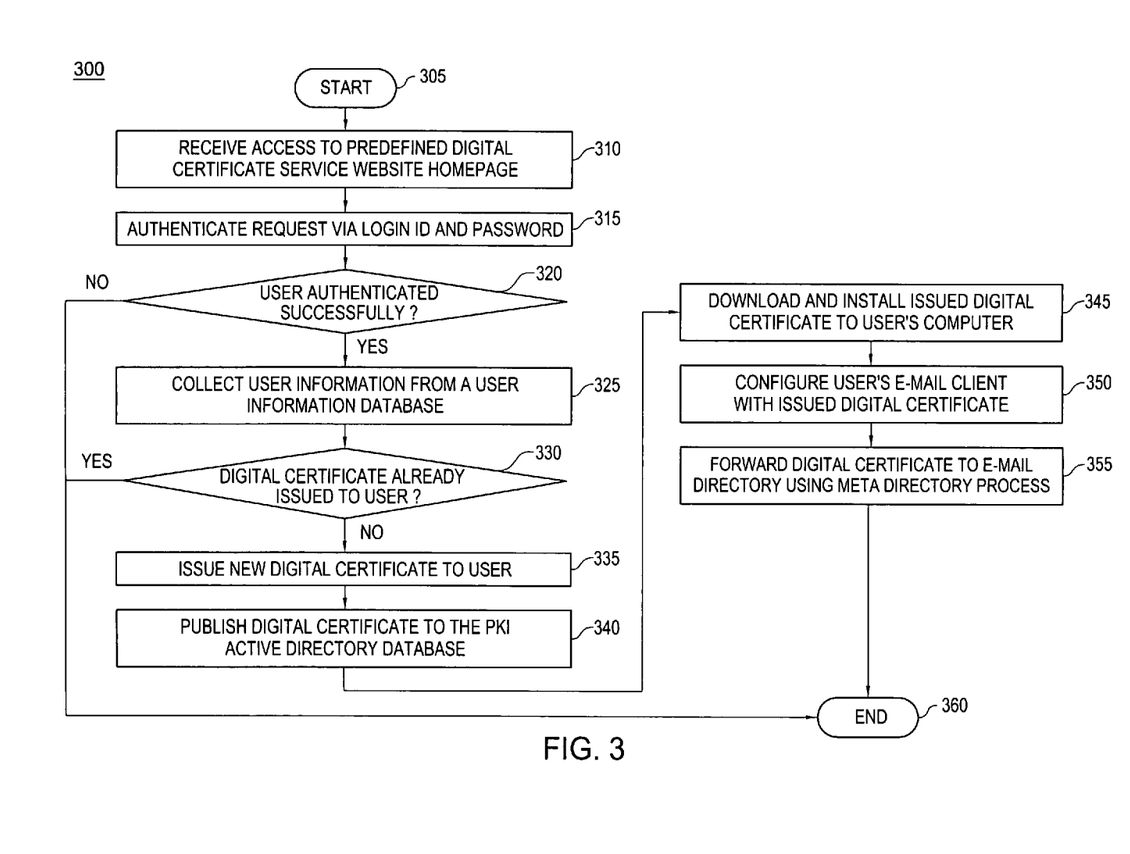
FIG. 3 illustrates a flowchart of a method for Secure Messaging Service (SMS) certificate issuing process in a packet network, e.g., an IP network, of the present invention.

FIG. 3 illustrates a flowchart of a method 300 for issuing a Secure Messaging Service (SMS) certificate in a packet network, e.g., an IP network, of the present invention. Method 300 starts in step 305 and proceeds to step 310.

In step 310, the method receives a request for access from a user to a predefined website to obtain a digital certificate, also known as a SMS certificate. For example, the request is received by a CA of a PKI.

In step 315, the method authenticates the user by prompting the user to enter the correct login identification (ID) and the corresponding password. The user's identity is authenticated by a security application or system such as a corporate network security platform. Only if the user provides the correct login ID and password, then the requested digitally certificate will be processed.

In step 320, the method checks if the user access has been authenticated successfully. If the user access has been authenticated successfully, the method proceeds to step 325; otherwise, the method proceeds to step 360.

In step 325, the method collects the user information from a user information database, such as a corporate human resource database. In one embodiment, LDAP is used to organize directory hierarchies and interfaces to directory servers that can be used by an end user to access directory listing to locate people, addresses, phone numbers, and other resources in a public Internet or a corporate intranet.

In step 330, the method checks if the user has already been issued a digital certificate. If the user has already been issued a digital certificate, the method proceeds to step 360; otherwise, the method proceeds to step 335.

In step 335, the method issues a new digital certificate for the user. A new digital certificate and a corresponding set of private and public keys are generated.

In step 340, the method publishes the issued digital certificate to the PKI active directory database. The user does not need to publish the issued digital certificate manually. The published digital certificate is now made available to be looked up by other users.

In step 345, the method downloads and installs the issued digital certificate along with the issued private key to the user's computer.

In step 350, the method configures the requesting user's email client with the issued digital certificate along with the private key. Once configured, the user can use the configured email client, such as "Microsoft Outlook" of Redmond, Wash., to send and receive encrypted and digitally singed messages to and from other users.

In step 355, the method forwards the issued digital certificate to the email address list directory using a meta directory process. In other words, the PKI automatically sends the issued digital certificate of the requesting user to the email address list directory, such as a corporate Global Address List in a Microsoft Outlook environment, so that the issued digital certificate is automatically made available to be searched by other users through the email address list directory. The method ends in step 360.

Figure 4:
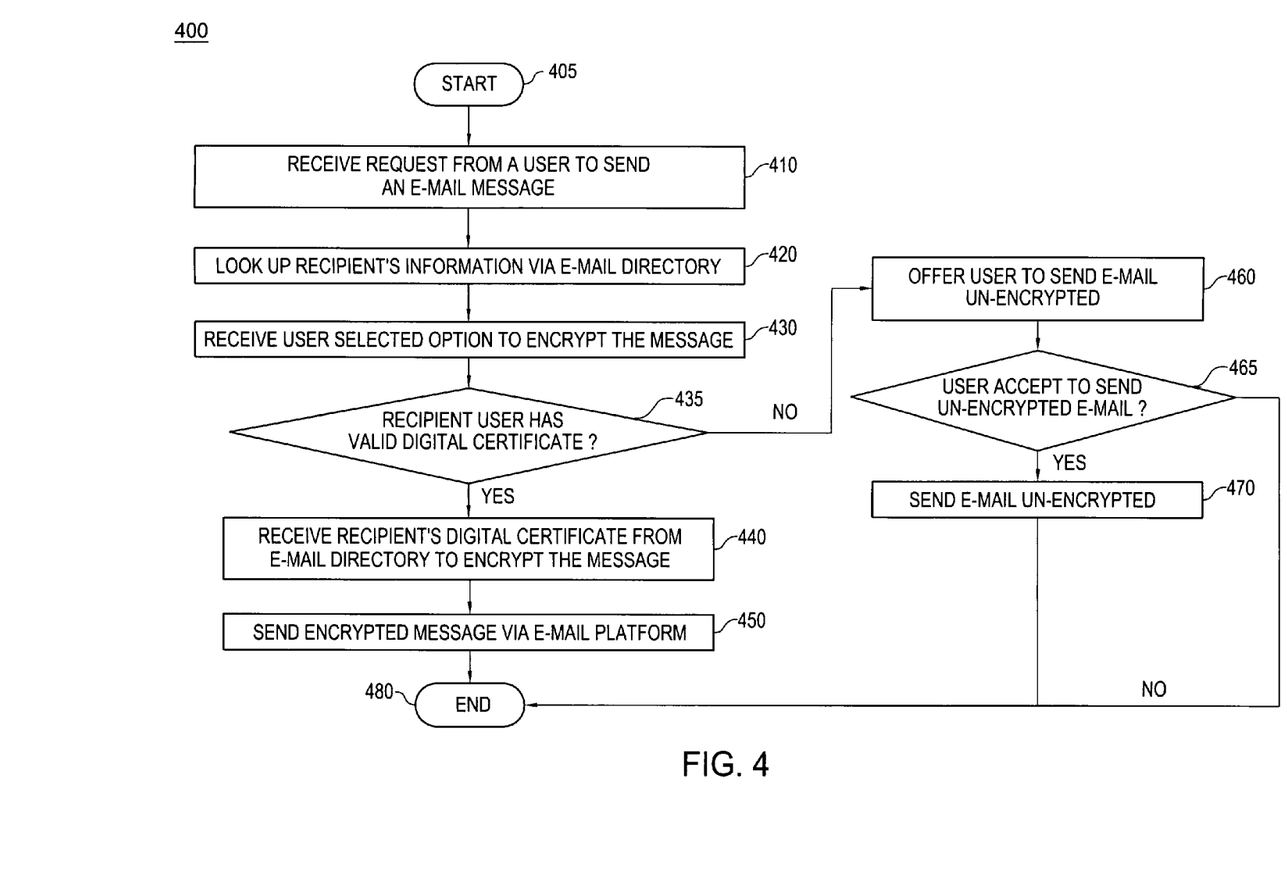
FIG. 4 illustrates a flowchart of a method for sending secure email message using SMS certificate in a packet network, e.g., an IP network, of the present invention.

FIG. 4 illustrates a flowchart of a method 400 for sending encrypted email message using a SMS certificate in a packet network, e.g., an IP network, of the present invention. Method 400 starts in step 405 and proceeds to step 410.

In step 410, the method receives a request from a user to send an email message. The request is received by the user's email client software.

In step 420, the method looks up the recipient's information via an email address list directory. The email address list directory is part of the email server or system serving the user. The email address list directory contains information related to the recipient including, but not limited to, the name, email address, mail address, phone number, digital certificate and other pertained information of the recipient.

In step 430, the method receives the user selected option to encrypt the email message. The user can select to send an email with or without encryption.

In step 435, the method checks if the recipient user has already been issued a valid digital certificate. If the recipient user has already been issued a valid digital certificate, the method proceeds to step 440; otherwise, the method proceeds to step 460.

In step 440, the method retrieves the recipient's digital certificate resulting from the email address list directory search and uses the recipient's public key comprised in the retrieved digital certificate to encrypt the email message to be sent since the user has selected to encrypt the outgoing email message.

In step 450, the method encrypts the email message using the recipient's public key and sends the email message using the user's email client.

In step 460, the method offers the user to send the email un-encrypted. Namely, the method recognizes that the intended recipient will be unable to decrypt an encrypted message.

In step 465, the method checks if the user accepts the offer to send the composed email un-encrypted. If the user accepts the offer to send the composed email un-encrypted, the method proceeds to step 470; otherwise, the method proceeds to step 480.

In step 470, the method sends the email un-encrypted to the recipient. The method ends in step 480.

Figure 5:
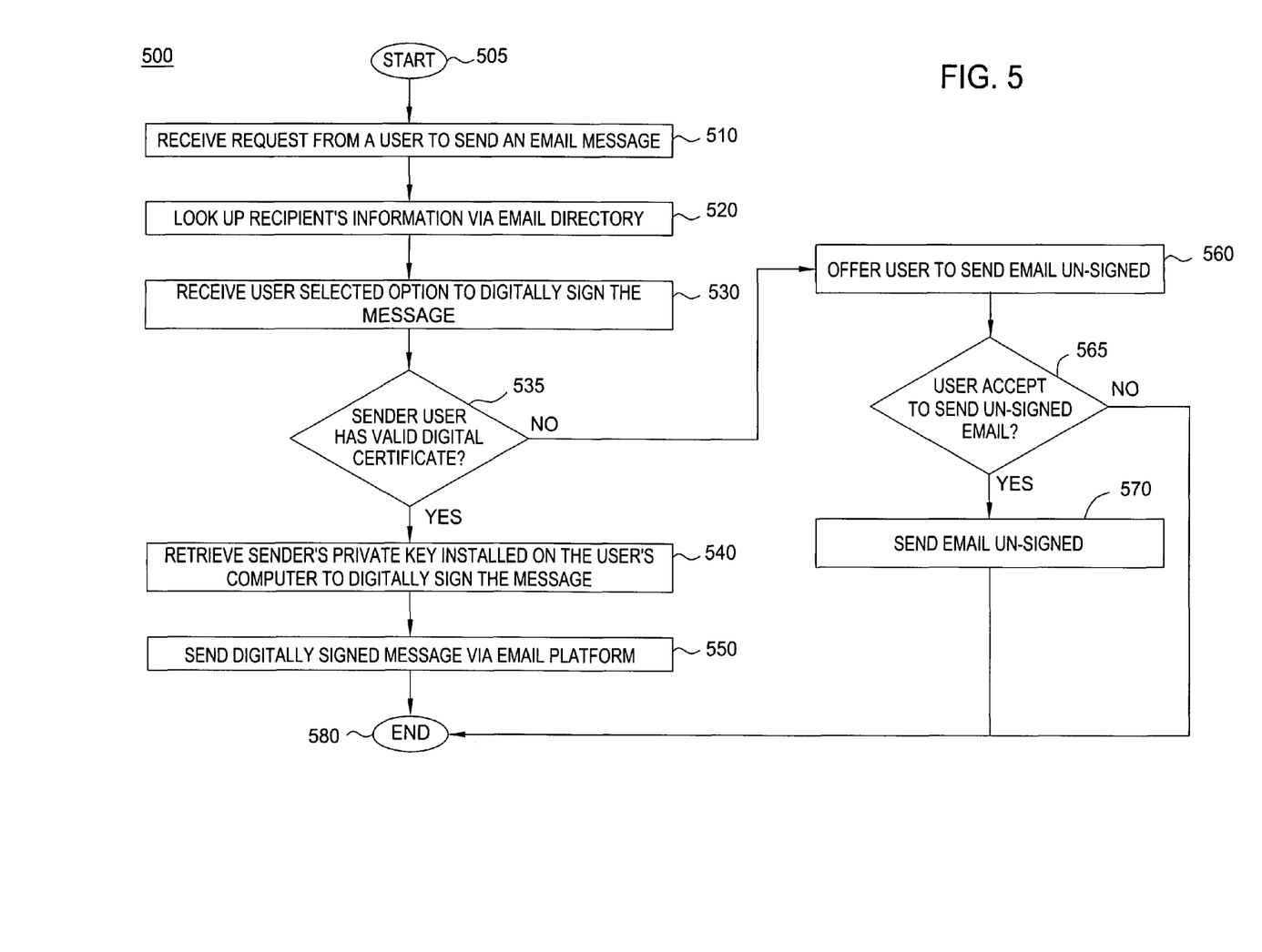
FIG. 5 illustrates a flowchart of a method for sending digitally signed email message using SMS certificate in a packet network, e.g., an IP network, of the present invention.

FIG. 5 illustrates a flowchart of a method 500 for sending digitally signed email message using SMS certificate in a packet network, e.g., an IP network, of the present invention. Method 500 starts in step 505 and proceeds to step 510.

In step 510, the method receives a request from a user to send an email message. The request is received by the user's email client software.

In step 520, the method looks up the recipient's information via an email address list directory. The email address list directory is part of the email server or system serving the user. The email address list directory contains information related to the recipient including, but not limited to, the name, email address, mail address, phone number, digital certificate and other pertained information of the recipient.

In step 530, the method receives the user selected option to digitally sign the email message. The user can select to send an email with or without digital signature.

In step 535, the method checks if the sender user has already been issued a valid digital certificate. If the sender user has already been issued a valid digital certificate, the method proceeds to step 540; otherwise, the method proceeds to step 560.

In step 540, the method retrieves the sender's private key downloaded and installed on the sender's user computer and uses the sender's private key comprised to digitally sign the email message to be sent since the user has selected to digitally sign the outgoing email message.

In step 550, the method encrypts the email message using the sender's private key and sends the email message using the user's email client.

In step 560, the method offers the user to send the email un-signed. Namely, it is not possible to generate a digitally signed email message without a valid digital certificate.

In step 565, the method checks if the user accepts the offer to send the composed email un-signed. If the user accepts the offer to send the composed email un-signed, the method proceeds to step 570; otherwise, the method proceeds to step 580.

In step 570, the method sends the email un-signed to the recipient. The method ends in step 580.

Figure 6:
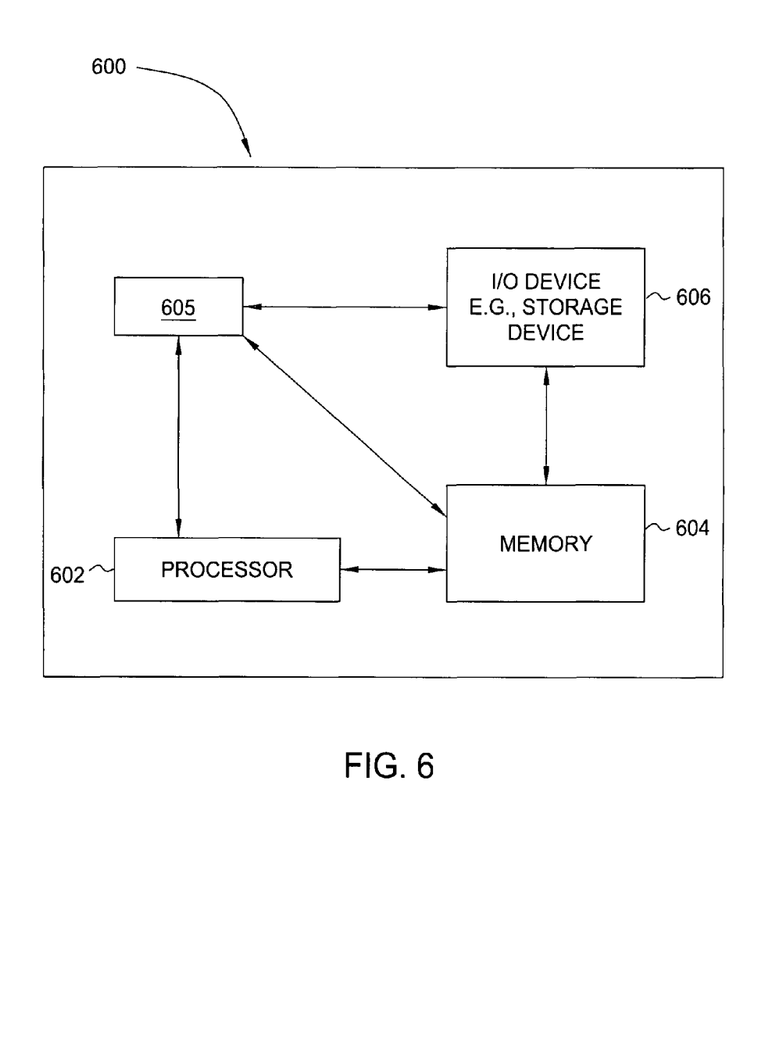
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing a Secure Messaging Service (SMS) certificate registration process, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing a Secure Messaging Service (SMS) certificate registration process can be loaded into memory 604 and executed by processor 602 to implement the functions as discussed above. As such, the present process 605 for providing a Secure Messaging Service (SMS) certificate registration process (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for using a secure messaging service certificate in a communication network, comprising:

publishing a digital certificate pertaining to a sender to a directory;

receiving a request from the sender to send an encrypted email message; and using the digital certificate automatically to generate an encrypted email message, wherein the using comprises using a private key of the sender that was issued with the issued digital certificate to generate the encrypted email message, where the encrypted email message is a digitally signed email message that requires a decryption with a public key of the sender that was issued with the issued digital certificate.

2. The method of claim 1, wherein the communication network is an internet protocol network.

3. The method of claim 1, further comprising:

processing a request from the sender to issue the issued digital certificate, where the sender is a corporate user.

4. The method of claim 3, wherein the processing comprises:
- authenticating the corporate user via a corporate network security platform;
- issuing the digital certificate to the corporate user if the corporate user has not been issued a digital certificate; and
- installing the digital certificate along with the private key of the corporate user to an email client application of the corporate user.

5. The method of claim 1, wherein the publishing comprises:
- publishing the digital certificate of the sender to a public key infrastructure active directory; and
- forwarding the digital certificate that is published to an email address list directory for storing user information of the sender.

6. The method of claim 1, wherein the digitally signed email message is automatically encrypted using the private key of the sender.

7. A non-transitory computer-readable medium having stored thereon a plurality of instructions, the plurality of instructions including instructions which, when executed by a processor, cause the processor to perform a method for using a secure messaging service certificate in a communication network, comprising:
- publishing a digital certificate pertaining to a sender to a directory;
- receiving a request from the sender to send an encrypted email message; and
- using the digital certificate automatically to generate an encrypted email message, wherein the using comprises using a private key of the sender that was issued with the digital certificate to generate the encrypted email message, where the encrypted email message is a digitally signed email message that requires a decryption with a public key of the sender that was issued with the digital certificate.

8. The non-transitory computer-readable medium of claim 7, wherein the communication network is an internet protocol network.

9. The non-transitory computer-readable medium of claim 7, further comprising:
- processing a request from the sender to issue the digital certificate, where the sender is a corporate user.

10. The non-transitory computer-readable medium of claim 9, wherein the processing comprises:
- authenticating the corporate user via a corporate network security platform;
- issuing the digital certificate to the corporate user if the corporate user has not been issued a digital certificate; and
- installing the digital certificate along with the private key of the corporate user to an email client application of the corporate user.

11. The non-transitory computer-readable medium of claim 7, wherein the publishing comprises:
- publishing the digital certificate of the sender to a public key infrastructure active directory; and
- forwarding the digital certificate that is published to an email address list directory for storing user information of the sender.

12. The non-transitory computer-readable medium of claim 7, wherein the digitally signed email message is automatically encrypted using the private key of the sender.

13. An apparatus for using a secure messaging service certificate in a communication network, comprising:
- a hardware processor configured to:
- publish a digital certificate pertaining to a sender to a directory;
- receive a request from the sender to send an encrypted email message; and
- use the digital certificate automatically to generate an encrypted email message, by using a private key of said the sender that was issued with said the digital certificate to generate the encrypted email message, where the encrypted email message is a digitally signed email message that requires a decryption with a public key of the sender that was issued with the digital certificate.

14. The apparatus of claim 13, wherein the communication network is an internet protocol network.

\* \* \* \* \*